(12) United States Patent
Modesette et al.

(10) Patent No.: US 12,006,088 B2
(45) Date of Patent: Jun. 11, 2024

(54) INTELLIGENT LABEL AUTOMATED CAPTURE SOLUTIONS

(71) Applicant: Avery Dennison Retail Information Services LLC, Mentor, OH (US)

(72) Inventors: Chad Modesette, Mentor, OH (US); Michael Begley, West Carrollton, OH (US); John Powell, Centerville, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/997,847

(22) PCT Filed: May 18, 2021

(86) PCT No.: PCT/US2021/032999
§ 371 (c)(1),
(2) Date: Nov. 3, 2022

(87) PCT Pub. No.: WO2021/236665
PCT Pub. Date: Nov. 25, 2021

(65) Prior Publication Data
US 2023/0339645 A1    Oct. 26, 2023

Related U.S. Application Data

(60) Provisional application No. 63/026,596, filed on May 18, 2020.

(51) Int. Cl.
*B65C 9/44* (2006.01)
*B65C 1/02* (2006.01)
(Continued)

(52) U.S. Cl.
CPC ............... *B65C 9/44* (2013.01); *B65C 1/021* (2013.01); *G06K 5/00* (2013.01); *G06K 17/0032* (2013.01);
(Continued)

(58) Field of Classification Search
CPC ... B65C 9/44; B65C 1/021; B65C 2009/0003; B65C 2009/404; G06K 5/00; G06K 17/0032; G06K 19/07718
See application file for complete search history.

(56) References Cited

U.S. PATENT DOCUMENTS 7,114,654 B2    10/2006    Chapman et al.
7,511,622 B2    3/2009    Korzeniewski
(Continued)

FOREIGN PATENT DOCUMENTS

EP    1698999    11/2018
JP    2007-118259    5/2007
(Continued)

OTHER PUBLICATIONS

International Preliminary Report on Patentability dated Nov. 17, 2022 issued in corresponding IA No. PCT/US2021/032999 filed May 18, 2021.
International Search Report and Written Opinion issued in corresponding IA No. PCT/US2021/032999 filed May 18, 2021.

*Primary Examiner* — George R Koch

(57) ABSTRACT

In some embodiments, an RFID label rejecting system includes an imager for scanning an RFID label, and a label removal component for discarding an inoperable RFID label. The label removal component may include a paddle configured to receive the inoperable label as part of the removal process. The label removal component may include a retraction system configured to position the paddle in an ejection path of the label rejection system to receive a rejected label. The label removal component may include a (Continued)

removable liner on the paddle configured to receive the rejected label and to be discarded with the rejected label. The label removal component may include a pressurized gas system configured for ejecting a rejected label.

12 Claims, 8 Drawing Sheets

(51) Int. Cl.
- *B65C 9/00* (2006.01)
- *B65C 9/40* (2006.01)
- *G06K 5/00* (2006.01)
- *G06K 17/00* (2006.01)
- *G06K 19/077* (2006.01)

(52) U.S. Cl.
CPC ............... *G06K 19/07718* (2013.01); *B65C 2009/0003* (2013.01); *B65C 2009/404* (2013.01)

(56) References Cited

U.S. PATENT DOCUMENTS

| | | | |
|---|---|---|---|
| 2003/0227528 A1 | 12/2003 | Hohberger et al. | |
| 2005/0167024 A1* | 8/2005 | Sanzone | B65C 9/28 |
| | | | 156/64 |
| 2006/0144521 A1* | 7/2006 | Esposito | B65C 9/40 |
| | | | 156/542 |
| 2006/0249240 A1 | 11/2006 | Dijkstra | |
| 2007/0187501 A1* | 8/2007 | Lenkl | B65C 9/40 |
| | | | 235/432 |
| 2008/0189059 A1 | 8/2008 | Choong et al. | |
| 2009/0065151 A1* | 3/2009 | Mochida | B65C 9/40 |
| | | | 156/388 |
| 2018/0186496 A1* | 7/2018 | Mevada | B65C 9/40 |

FOREIGN PATENT DOCUMENTS

| | | | |
|---|---|---|---|
| JP | 2007118259 A | * | 5/2007 |
| JP | 2007-204060 | | 8/2007 |

* cited by examiner

INTELLIGENT LABEL AUTOMATED CAPTURE SOLUTIONS

CROSS-REFERENCE TO RELATED APPLICATIONS

The present application is a 371 of International Application No. PCT/US2021/032999, which was published in English on Nov. 25, 2021, and claims the benefit of U.S. Provisional Patent Application No. 63/026,596 filed May 18, 2020, both of which are incorporated herein by reference in their entireties.

FIELD

The present invention relates generally to radio frequency identification (RFID) labels, and devices used for the automatic application of RFID enabled intelligent labels. More particularly, the present disclosure relates to an apparatus that is fully integrated with an automated label applicator or an automated RFID enabled printer applicator and may be utilized to remove those RFID enabled intelligent labels that are marked or known to be defective from a label liner, prior to the application of labels to a product or carton of products to ensure that only functioning RFID labels are applied.

BACKGROUND

Generally stated, RFID is the use of electromagnetic radiation or energy to stimulate a responsive device (known as an RFID "tag" or transponder) to identify itself and, in some cases, provide additional information and/or data stored in the tag. RFID tags typically include a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. The reader converts the radio waves from the RFID device into a form that can be utilized by a computer.

Conventional labels are manufactured from label stock that typically includes a substrate or face layer, also referred to as a face stock, an adhesive layer adhered to the face layer, and a protective release liner removably adhered to the adhesive layer (linerless labels do contain a release liner). To form an RFID label, a RFID tag is printed on or otherwise incorporated into the face layer of the conventional label. Further, the label stock is generally provided in a continuous format or roll form. Individual labels may be produced by die cutting the face layer and the adhesive layer, and then removing the surrounding waste matrix, thereby leaving the individual labels adhered to the release liner.

RFID tags and labels are widely used to associate an object, such as a carton, box, container, or individual product with a unique identification code. When used to track or manage inventory, the microprocessor stores unique identifying data associated with the inventory. An operator can then use an external receiver/reader to retrieve the stored data and process or track the inventory. One difficulty with manufacturing RFID labels and inlays is that a certain percentage, typically 0.4-0.6 percent, either fail to meet specification or are completely inoperable. When it is determined that a label or inlay fails to meet specification or is inoperable, the label or inlay is typically marked with a printed square of ink indicating inoperability. This process is completed prior to the inlays being sent to the label converter.

Label converting produces RFID labels that incorporate the RFID chip and antenna inlays. When the label converter adds the inlays to a label substrate to create an intelligent label, the press on which the addition is performed prints human readable and bar code data on the label substrate. Immediately following this step, a secondary check of the RFID tag is performed. The equipment then attempts to interrogate or read the data from each tag. If the interrogation is unsuccessful, indicating a defective tag, the barcode on the tag is over-printed (typically with a printed square), thereby rendering the tag inoperable. When RFID intelligent labels are then used on automated label applicators, there is a need to remove the labels with inoperable RFID tags. If an inoperable label/tag is affixed to a product or carton, the product or carton must be reworked and, in some cases, completely discarded due to the permanent nature of the adhesive which can cause damage to the product or carton if removed post application.

There exists a need for an automated RFID tag and label rejection mechanism for removal of inoperable or otherwise defective tags and labels prior to their application.

Therefore, it is an object of this disclosure to provide an automated RFID tag and label rejection mechanism that could be integrated with an automated label applicator or printer applicator system which could, in turn, provide a means for removing inoperable RFID tags and labels prior to application. The mechanism could be incorporated with the automated label applicator or RFID printer applicator system along a section of its conveyer.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Systems, devices, apparatuses, and methods for determining whether an RFID label is operative and removing the label if it is inoperative are described herein.

In some embodiments, an RFID label rejecting system includes an imager for scanning an RFID label, and a label removal component for discarding an inoperable RFID label. The label removal component may include a paddle configured to receive the inoperable label as part of the removal process. The label removal component may include a retraction system configured to position the paddle in an ejection path of the label rejection system to receive a rejected label. The label removal component may include a removable liner on the paddle configured to receive the rejected label and to be discarded with the rejected label. The label removal component may include a pressurized gas system configured for ejecting a rejected label.

The pressurized gas system may include a pressurized gas reservoir. The label removal component includes a tamper for receiving a rejected label. The system may be controlled by a programmable logic controller. The programmable logic controller triggers the RFID label rejecting mechanism to scan a RFID label for operability. The programmable logic controller may include a human machine interface. The imager may include one or both of a bar code reader and a camera.

In some embodiments, a method for rejecting an RFID label includes scanning an upcoming RFID label using an imager, determining that the upcoming RFID label may be an inoperable RFID label, and discarding the inoperable RFID label using a label removal component. Discarding the inoperable RFID label may include receiving the inoperable RFID label on a paddle. Discarding the inoperable RFID label may include, prior to receiving the inoperable RFID label on the paddle, extending the paddle into an ejection path of the label rejection system using a retraction system. A removable liner on the paddle may be used to receive the inoperable RFID label. Discarding the inoperable RFID label may include using a pressurized gas system to eject the rejected label. Discarding the inoperable RFID label may include, prior to ejecting the rejected label using a pressurized gas system, receiving the inoperable RFID label using a tamper.

Scanning the upcoming RFID label for operability may be triggered by a programmable logic controller. The imager may include one or both of a barcode reader and a camera. Scanning may detect the inoperable label by recognizing over printing or the presence of an ink marker.

In some embodiments, an automatic label applicator includes a label application module, a programmable logic controller, and an RFID label rejecting system configured to reject inoperable RFID labels. The automated label applicator further may include a scanner and a conveyor, the conveyor being positioned to hold an upcoming RFID label in position for scanning by the scanner. The RFID automatic label applicator may be capable of directly applying RFID tags and labels to a product, packaging, or cartons of products.

In some embodiments, the system includes an RFID label rejecting mechanism. In some embodiments, the RFID label rejecting mechanism is controlled by a programmable logic controller (PLC). In some embodiments, the RFID label rejecting mechanism includes an imager for scanning a plurality of RFID labels or tags. In some embodiments, the imager is a two dimensional scanner or imaging device, such as a camera.

In some embodiments, the RFID label rejecting mechanism is integrated with an automatic label applicator or an automated RFID enabled printer applicator. In some embodiments, the RFID labels are in the form of a roll, wherein the roll contains a plurality of labels attached to a liner. In some embodiments, each of the plurality of RFID labels has a two dimensional barcode and human readable text printed on the RFID label. In some embodiments, the barcode on an inoperable RFID label is overprinted indicating inoperability. In other embodiments, a roll of RFID tags contains a plurality of "wet" RFID inlays attached to a backer. If there is no printed information (e.g., 2D barcode), an ink marker may be printed on any inoperable RFID tags. The imager is triggered by the PLC to scan each RFID label or tag for the overprinting or presence of the ink marker, thereby indicating inoperability.

In some embodiments, the RFID label rejecting mechanism further contains a label removal component. The label removal component may be configured to remove inoperable RFID labels from a roll of RFID tags or labels prior to their application by an automatic label applicator or an automated RFID enabled printer applicator. In some embodiments, the label removal component contains or includes a pneumatic valve powered by a solenoid, a pneumatic actuator, and a retractable paddle. The pneumatic valve causes the pneumatic actuator to position the retractable paddle to receive an inoperable tag or label. In some embodiments, the label removal component further contains a second pneumatic valve configured to move the inoperable tag or label to the retractable paddle. In some embodiments, the retractable paddle contains or includes a removable a liner for securing the inoperable tag or label, and ease of removing the inoperable tags or labels periodically as they build up.

In other embodiments, an automated RFID enabled printer applicator contains or includes a RFID label application module, a programmable logic controller, and a RFID label rejecting system. The RFID label rejecting system contains an imager for scanning a plurality of RFID labels or tags. In some embodiments, the imager is two dimensional scanner or imaging device, such as a camera. A roll of RFID labels comprises a plurality of RFID tags, and the automated RFID enabled printer applicator attempts to encode data to each RFID tag If the tag fails to encode, the label is printed with an overstrike pattern and the printer applicator provides a bad tag separator signal (BTS) to the PLC indicating a bad tag is about to be dispensed. The PLC then causes the same actions to reject the tag.

The RFID label rejecting mechanism further comprises a label removal component. The label removal component may be configured to remove inoperable RFID labels from a roll or RFID tags or labels prior to application by an automatic label applicator or an automated RFID enabled printer applicator. The label removal component may include a pneumatic valve that is powered by a solenoid, a pneumatic actuator, and a retractable paddle. The pneumatic valve causes the pneumatic actuator to position the retractable paddle to receive an inoperable tag or label. The label removal component may include a second pneumatic valve configured to move the inoperable tag or label to the retractable paddle. The retractable paddle may include a removable liner for securing the inoperable tag or label, and removing the inoperable tag or label from the application cycle.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
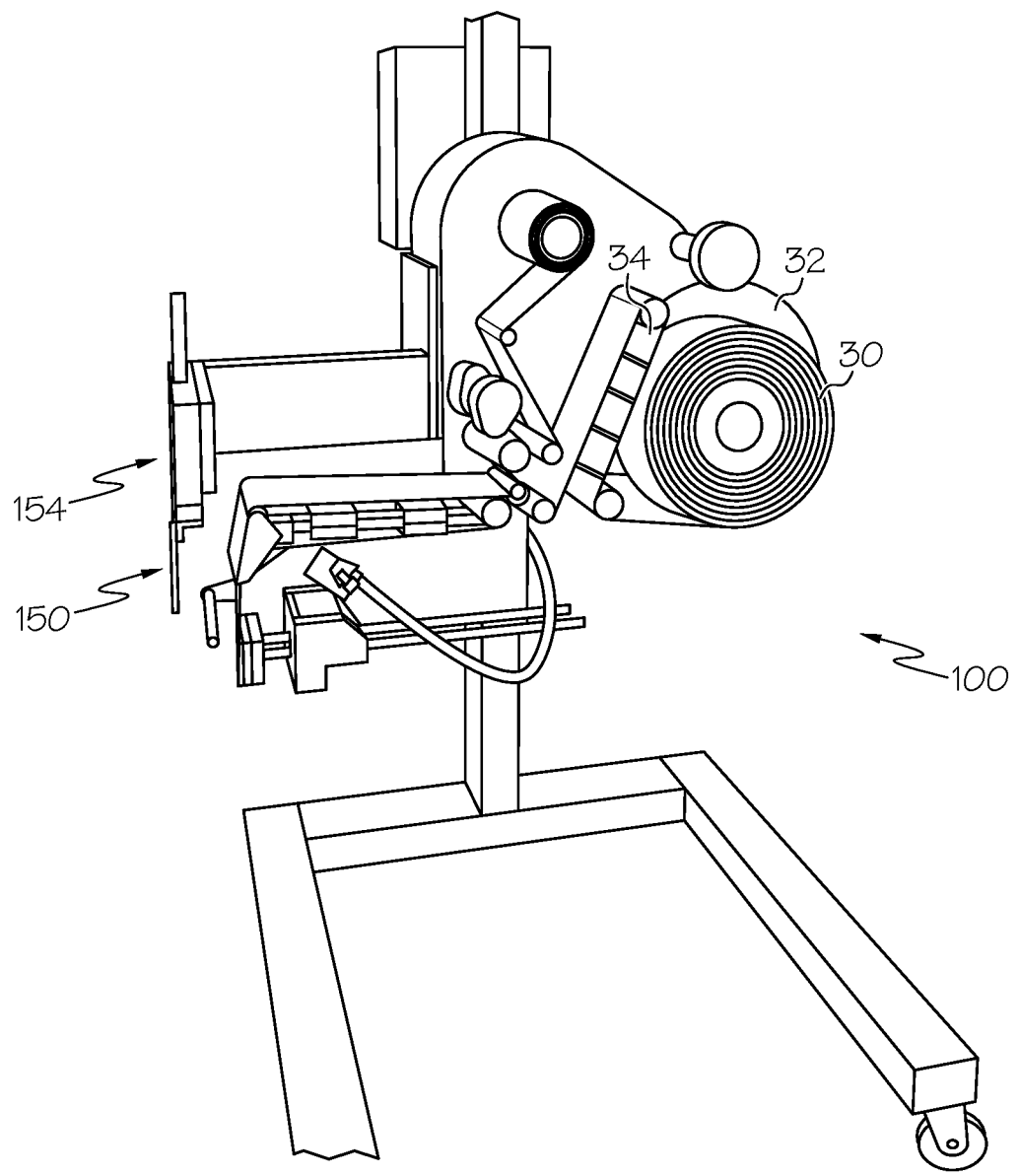
FIG. 1 illustrates a front perspective view of an automated label applicator comprising a RFID label rejecting mechanism in accordance with some embodiments.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Automated RFID tag reject systems and methods are described herein. In some embodiments, the automated RFID tag reject system is integrated with an automated label applicator, or a printer applicator system. In some embodiments, the automated label applicator is positioned over or beside a section of a product or package conveyer for the purpose of applying or encoding, printing, and/or applying the RFID labels automatically directly to products, product packaging, or cartons containing products. RFID labels and tags may be applied or removed using a multitude of application techniques including, but not limited to, tamp, blow on, tamp-blow, swing tamp, or swing tamp blow on.

FIG. 1 illustrates an exemplary RFID label rejecting system or apparatus 150 integrated into an automated label applicator 100 or an automated RFID enabled printer applicator (not shown). The applicator 100 contains a roll of labels and/or tags 30 and a roll of liner 32 to which the labels or tags are removably adhered, which together form the RFID tag or labels 34. The label rejecting system further contains a label removal component 150.

Figure 2:
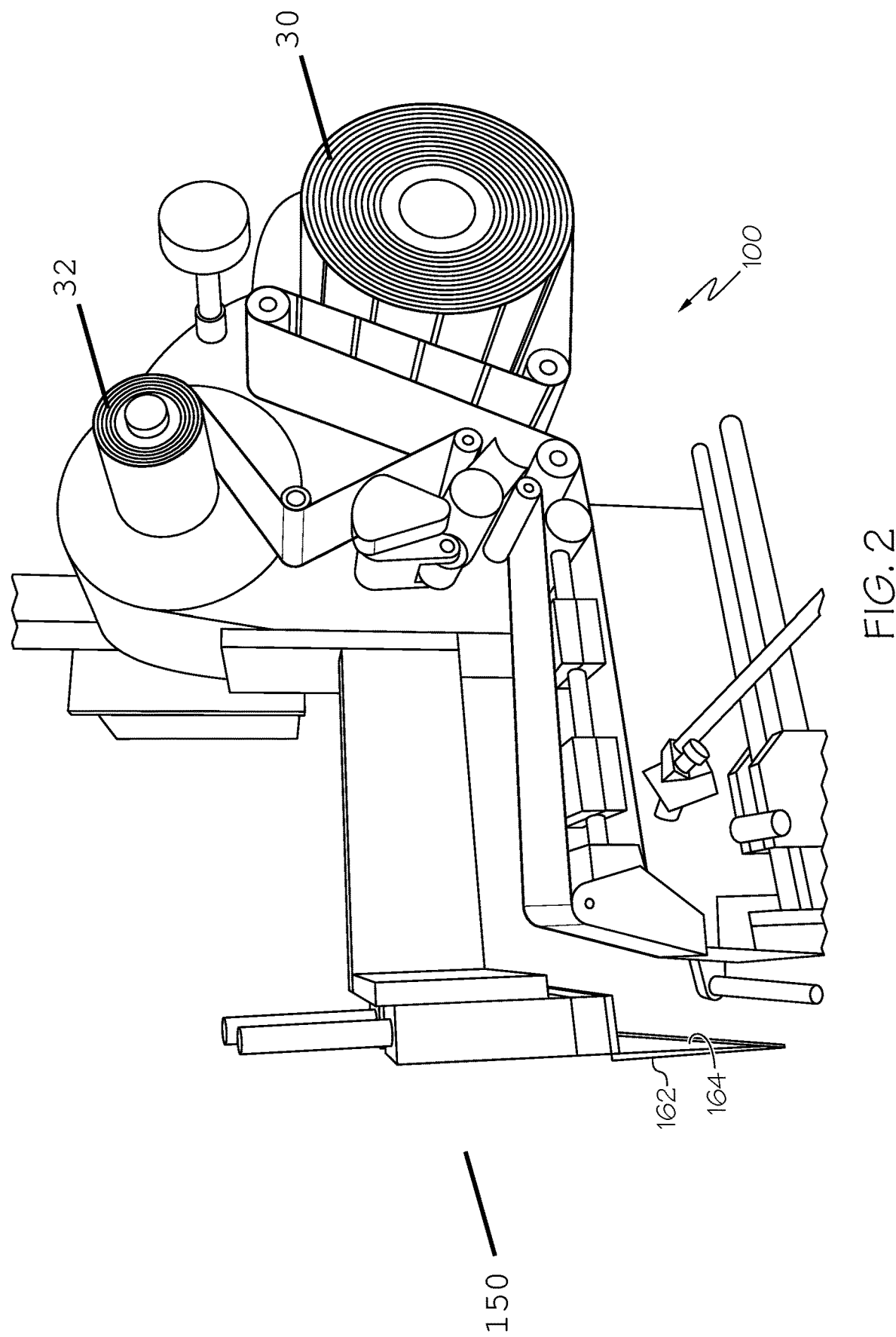
FIG. 2 illustrates a close up perspective view of the automated label applicator comprising the RFID label rejecting mechanism in accordance with some embodiments.

FIG. 2 is a close up view of the applicator 100 and RFID label rejecting system 150 in FIG. 1. Paddle 162 containing a removable liner 164 is used to remove the inoperable RFID labels.

Figure 3:
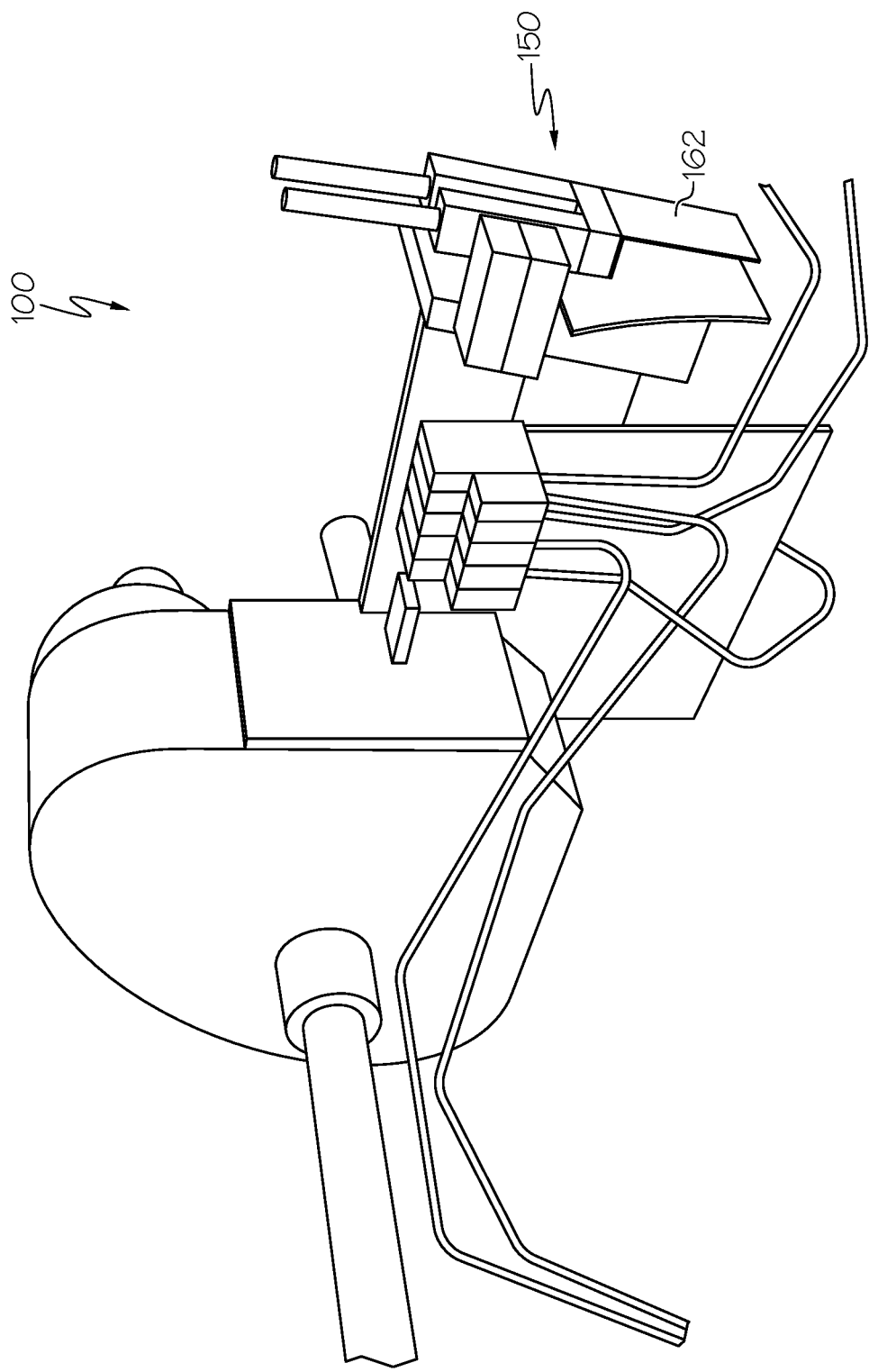
FIG. 3 illustrates a back side perspective view of the automated label applicator in accordance with some embodiments.

FIG. 3 is another angle of the applicator 100 and the RFID label rejecting system 150 in FIGS. 1 and 2. FIG. 3 shows another view of the paddle 162 used to remove the inoperable RFID labels.

Figure 4:
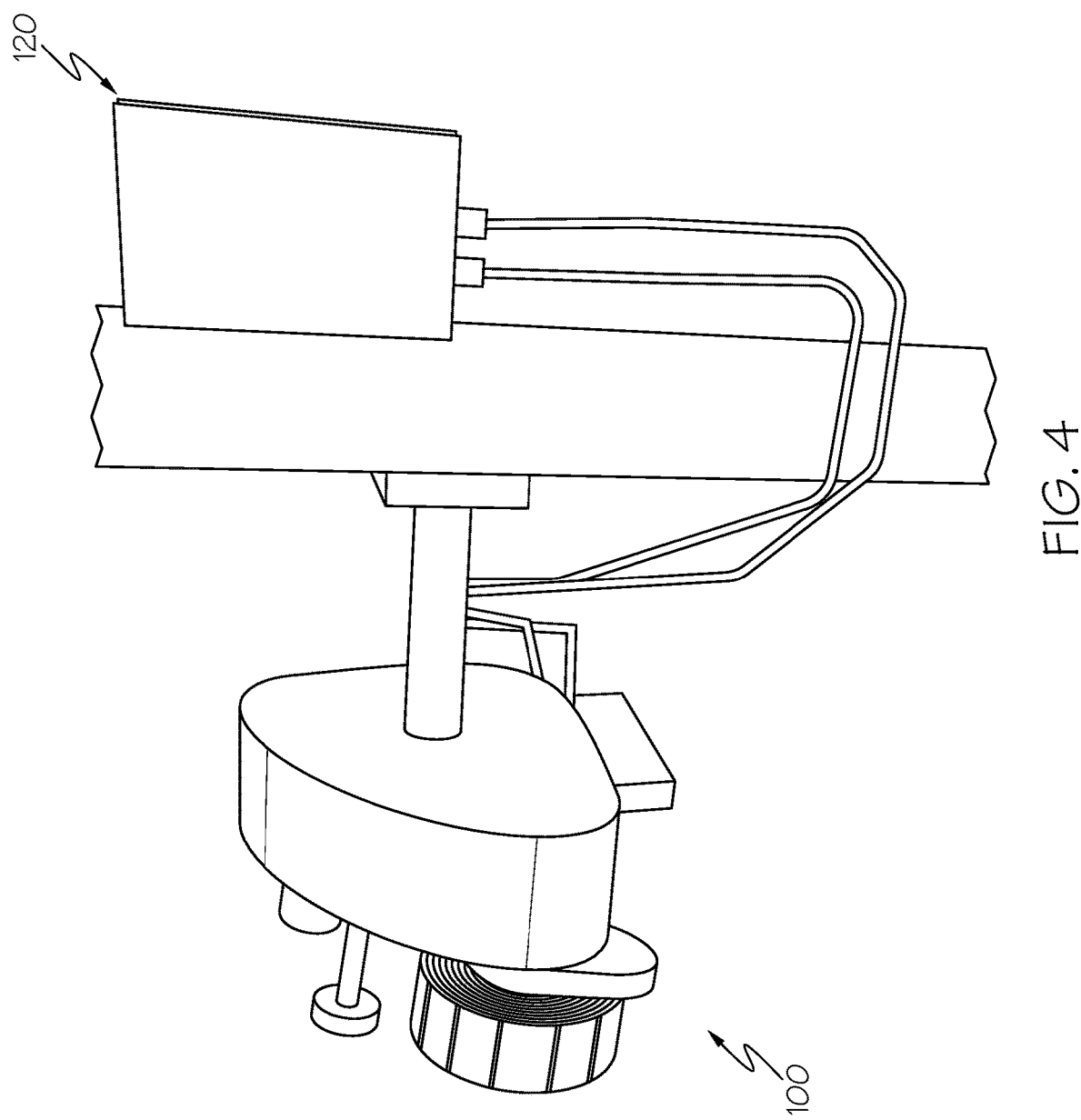
FIG. 4 illustrates an end perspective view of the automated label applicator in accordance with some embodiments.

FIG. 4 shows the RFID label rejecting system or apparatus 150 controlled by one or more computer processors and/or one or more programmable logic controllers 120. In some embodiments, the one or more computer processor may be part of an on-board or network connected computer, set of computers, or mobile devices. In some embodiments, the computer processor may be part of a remote server that communicates with and/or controls the programmable logic controller 120.

Figure 5:
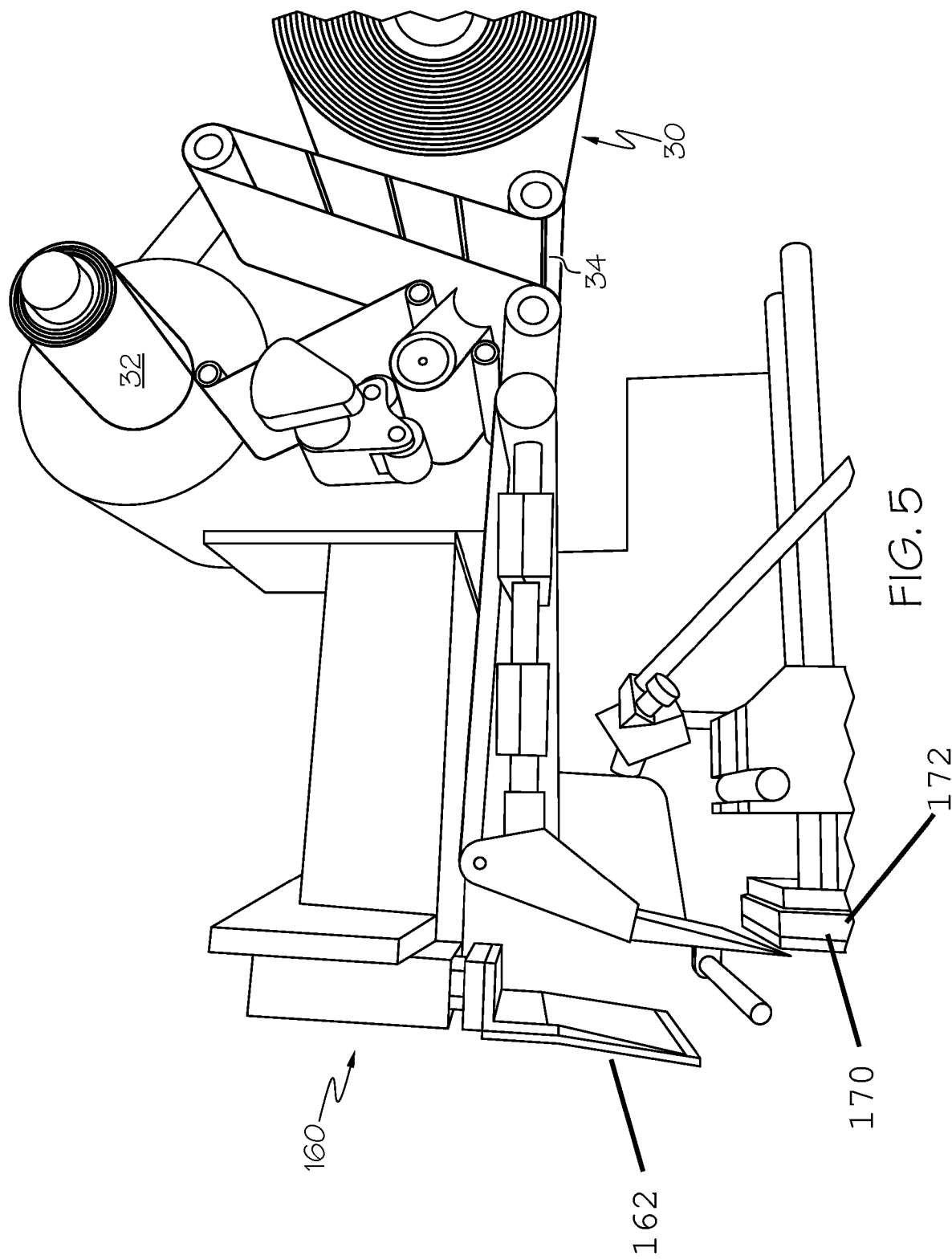
FIG. 5 illustrates a close up perspective view of the automated label applicator comprising the RFID label rejecting mechanism in accordance with some embodiments.

FIG. 5 shows another view of the applicator 100 and the RFID label rejecting system 150 containing a roll of labels or tags 30 and a roll of liner 32 to which the labels or tags are removably adhered, and which together form the RFID tag or labels 34. The label rejecting system further contains a pneumatic actuator 160 which may be configured to position the paddle 162 to accept inoperable RFID tags or labels. For example, in the illustrated embodiment, the pneumatic actuator 160 may be used to extend the paddle 162 down into an ejection path for a rejected RFID tag or label. The paddle 162 may then be retracted out of the way of a tamper to tamp (or otherwise deposit) an active non-rejected operable RFID tag or label onto a package, an envelope, or other object. For example, in some embodiments, an item such as a box, package, product, or envelope may be carried by a conveyer past the RFID label rejecting system 150, and the tamper 170 may be extended to deposit an active label onto the item.

Figure 6:
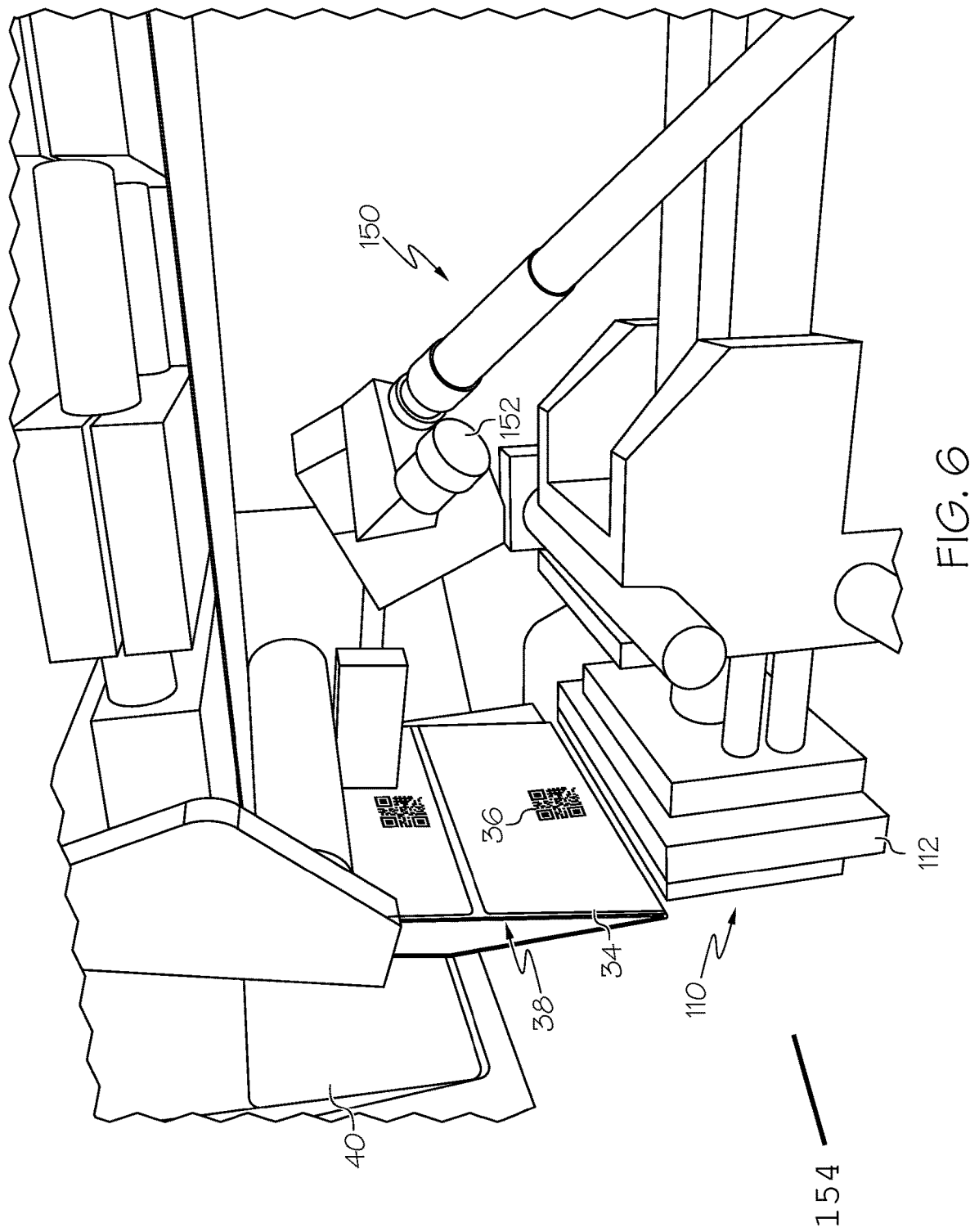
FIG. 6 illustrates a close up perspective view of the RFID label rejecting mechanism in accordance with some embodiments.

FIG. 6 is an image of a label application module 110. The module is capable of applying and/or rejecting RFID tags and labels 34 by one or more of the following processes: tamp, blow on, tamp-blow, swing tamp, or swing tamp blow on, or the like. In various embodiments, the label application module 110 contains a vacuum pad 112 configured to hold and/or apply each operable RFID label or tag 34. In various embodiments, the vacuum pad 112 is also used to hold non-operable RFID labels or tags 34 that are removed from the liner 32 and/or roll of RFID labels 30. For some embodiments, n operation, a roll of RFID labels 30 containing a plurality of RFID labels 34 is loaded onto the automated label applicator 100. In some embodiments, the roll of RFID labels 30 includes RFID labels 34 that are attached to a continuous liner that may be collected to form the roll of liner 32. In other embodiments, the roll of RFID labels 30 does not include a liner, and a liner does not need to be collected into the roll of liner 32.

In some embodiments, each of the plurality of RFID labels 34 has a two dimensional barcode 36 printed on the RFID label 34 to indicate operability. In some embodiments, inoperable RFID labels 34 may lack the barcode, or a rejection barcode may be provided to indicate that a given RFID label 34 is inoperable. In some embodiments, the barcode 36 on an inoperable RFID label 40 is over-printed indicating inoperability. Alternatively, a roll of RFID tags may comprise a plurality of "wet" RFID inlays attached to a backer. In some embodiments, an ink marker, such as a printed ink square, may be printed on an inoperable RFID tag.

As shown in FIG. 6, the RFID label rejecting system or apparatus 150 may contain an imager 152. The imager 152 can be or include one or more two dimensional imaging devices, such as a camera, laser scanner, and/or a 1D or 2D barcode reader. The imager 152 may be used to scan one or more of a plurality of RFID labels 34. The imager may be triggered and/or controlled by the one or more computer processors and/or one or more programmable logic controllers 120 to search for and recognize one or both of operable RFID labels or tags 38 or inoperable RFID labels or tags 40.

The RFID label rejecting system or apparatus 150 may further contain a label removal component 154. The label removal component 150 removes any inoperable or otherwise defective RFID tag or RFID label 34 from a roll of RFID labels or tags 30.

The roll of RFID labels 30 contains a plurality of RFID labels 34 that are removably attached to a liner 32. Each of the plurality of RFID labels 34 has a two dimensional barcode 36 printed on the RFID label 34 to indicate operability. The barcode 36 on an inoperable RFID label 40 is over-printed, or over struck, thereby indicating its inoperability. Alternatively, a roll of RFID tags may contain a plurality of "wet" RFID inlays attached to a backer, and an ink marker, such as a printed ink square, may be printed thereon to indicate an inoperable RFID tag.

Figure 7:
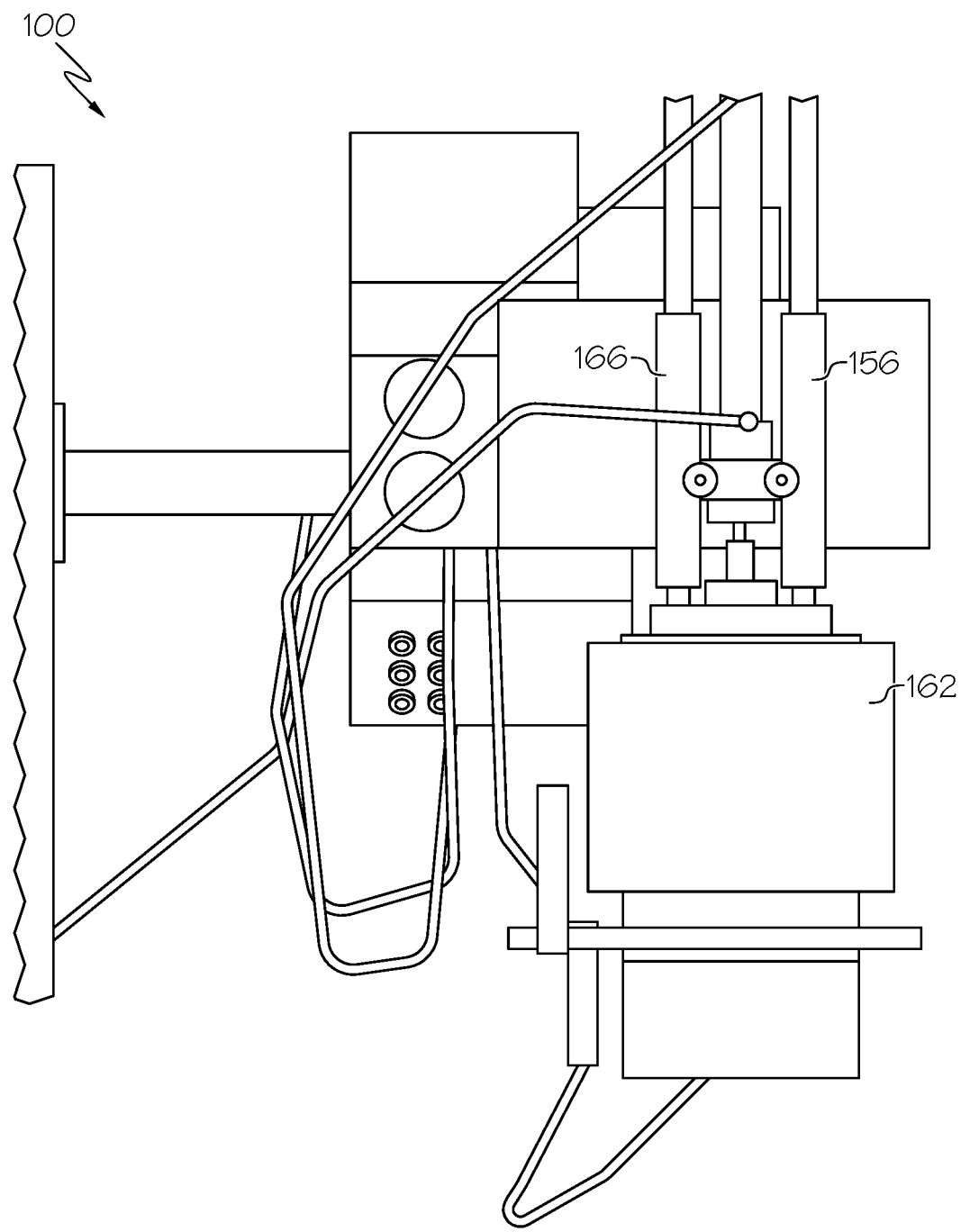
FIG. 7 illustrates a front end perspective view of the automated label applicator in accordance with some embodiments.
Figure 8:
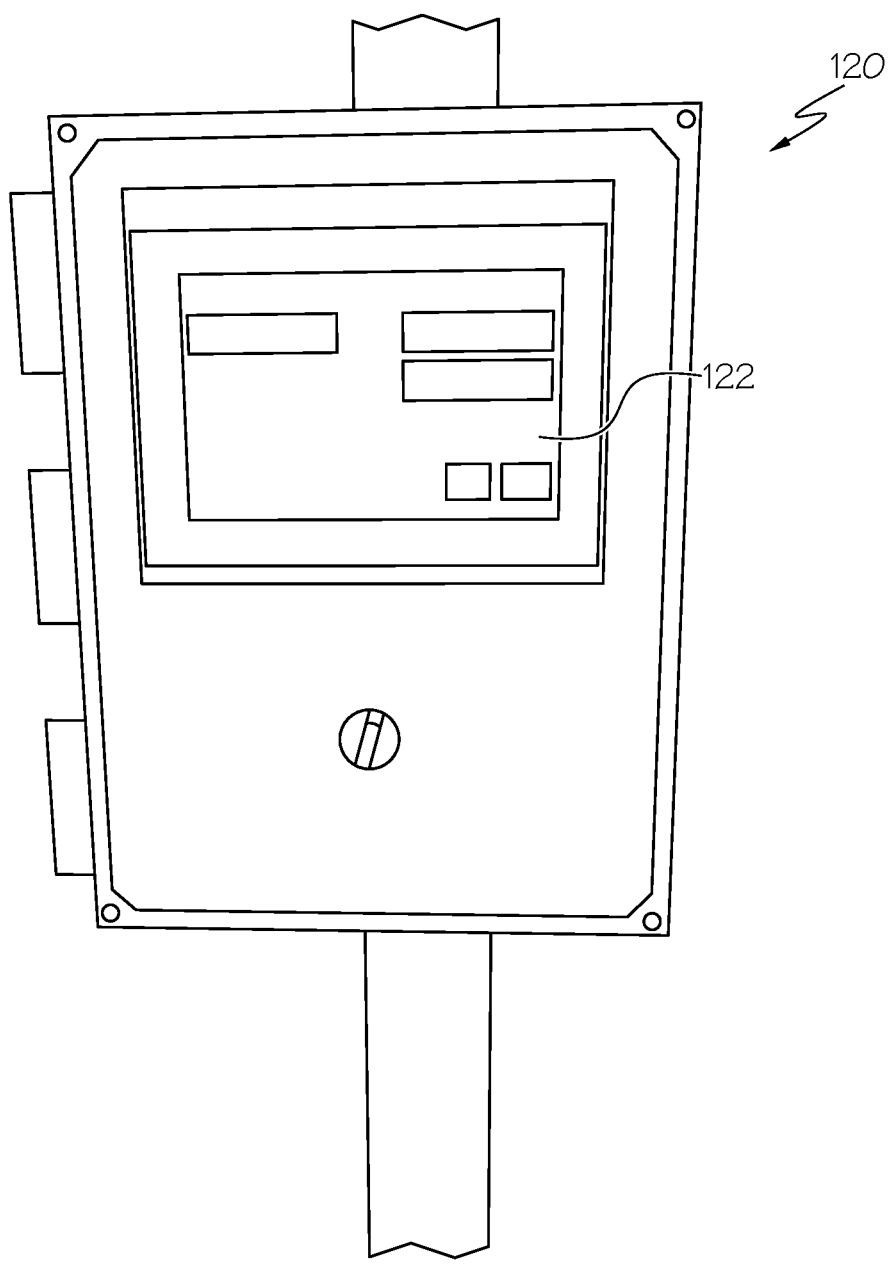
FIG. 8 illustrates a perspective view of a programmable logic controller of the automated label applicator in accordance with some embodiments.

As shown in FIG. 7, the label removal component 154 can contain a pneumatic valve that is part of a pressurized gas system that may be operable by a solenoid. The pressurized gas system may include a tank that holds pressurized gas or fluid, and may include pumps, fans, or other systems designed to control gas or fluid pressure for pneumatic or hydraulic systems. The solenoid may be energized by an output from the one or more processors and/or programmable logic controllers 120. In some embodiments, the label removal component 154 may further contain a pneumatic actuator 160 and a paddle 162, wherein the pneumatic actuator 160 may be a cylinder or rotary actuator and the paddle 162 may be a retractable paddle. More specifically, the pneumatic valve 156 may cause the pneumatic actuator 160 to position (e.g., by extending, moving, retracting or otherwise placing) the paddle 162 into an ejection and/or tamping path to accept (or otherwise receive) the inoperable RFID label 40. The pneumatic valve 156 may then cause the paddle 162 to be moved away to allow placement of operable RFID labels or tags, such as by a tamper. Additionally, the label removal component 154 may further comprise a second pneumatic valve that is configured to adhere the inoperable RFID label 40 to a removable liner 164 of the paddle 162. For example, the second pneumatic valve may shut off a vacuum for the vacuum pad 112, and/or the second pneumatic valve may cause FIG. 8 is a close up image of an exemplary human machine interface, such as for use with the one or more processors and/or programmable logic controllers 120.

In some embodiments, an automated label applicator 100 contains a label application module, one or more processors and/or programmable logic controllers 120, and a RFID label rejecting mechanism 150. The automated label applicator 100 may include any automated RFID label applicator that is known in the art that is capable of applying RFID tags and labels to a product, packaging, or cartons of products The automated label applicator 100 can be positioned over, or adjacent to, a section of conveyer (such as for products and/or packages) to apply, or encode, print, and apply, the RFID labels 34 or tags directly onto the product, packaging, or cartons of products.

In some embodiments, the RFID label rejecting mechanism 150 is automated and contains an imager 152. In some embodiments, the imager includes or is a one dimensional or two dimensional scanner, barcode reader, and/or imaging device, such as a camera. The one or more processors and/or programmable logic controllers 120 may be configured to trigger and/or control operation of the RFID label rejecting mechanism 150 to scan each of the plurality of RFID labels 34 for operability. More specifically, the imager 152 may be used to scan and analyze each of the plurality of RFID labels 34. The one or more processors and/or programmable logic controllers 120 may further be used to control the process of the removal of inoperable RFID labels or tags. The label removal component 154 is configured to remove any inoperable RFID tag or label 40, such as from the roll of RFID labels or tags 30.

In some embodiments, the label removal component 154 contains a pneumatic valve 156 that is operable by a solenoid that is energized by an output from the programmable logic controller 120, a pneumatic actuator 160, and a paddle 162. In various embodiments, the label removal component 154 may use any actuation system such as a linear or rotary electric motor, pneumatic pump, hydraulic pump, or pressurized gas or fluid system. In some embodiments, the pneumatic actuator 160 includes a cylinder, and the pneumatic valve 156 causes the pneumatic actuator 160 to position the paddle 162 to accept the inoperable RFID tag or label 40. As stated above, in some embodiments, the paddle 162 may be a retractable or otherwise moveable paddle. The label removal component 154 may further contain a second pneumatic valve 166 and/or actuation system configured to cause the label to release from the vacuum pad by use of a high volume burst of compressed air to adhere the inoperable RFID label 40 to a removable liner 164 of the paddle 162. In other embodiments, other actuation systems may include impact, friction, or other transport mechanisms that may throw, carry, pick up, slide, drop, or otherwise move the inoperable RFID label to the removable liner 164. For example, in some systems, simply removing the vacuum may be sufficient to allow the inoperable RFID label or tag 40 to drop to the paddle 162. In other systems, some additional effort such as movement of the tamper or placement of the paddle 162 onto the inoperable RFID label or tag 40 may be needed to remove the inoperable RFID label or tag 40 from the tamper 170.

In some embodiments, in operation, when an operable or "good" RFID label 38 is fed or dispensed off of the liner 32 onto the vacuum pad 112 of the label application module 110 in preparation for the next cycle, a signal, "Dispense End," is sent from the automated label applicator 100 to the one or more processors and/or programmable logic controllers 120. The one or more processors and/or programmable logic controllers 120 then triggers the imager 152 to begin scanning the next label of the plurality of RFID labels 34 to be fed (while still on the liner 32 or while otherwise attached to the plurality of RFID labels 34) for the two dimensional barcode 36 for a predefined period of time. If the imager 152 fails to interpret or decode the two dimensional barcode 36 within the predefined period of time, the imager 152 may provide an output signal to the one or more processors and/or programmable logic controllers 120 indicating a "No Read" condition and an inoperable RFID label 40. The one or more processors and/or programmable logic controllers 120 latches a signal until the operable, or good, RFID label 38 has been applied. In other embodiments, the one or more processors and/or programmable logic controllers 120 may identify a "Inoperable" condition by recognizing a barcode, overstrike pattern, or other symbol or marking associated with an inoperable RFID label 40.

In some embodiments, after application of the operable RFID label 38, the inoperable RFID label 40 is fed out onto the vacuum pad 112. When the label feed is complete, the programmable logic controller 120 triggers the imager 152 to scan the next label of the plurality of RFID labels 34 and simultaneously causes a separate output that energizes the solenoid on the pneumatic valve 156. The pneumatic valve 156 then causes the pneumatic actuator 160 to position the paddle 162 of the label removal component 154 in front of the label application module 110 vacuum pad 112. Once the paddle 162 is properly positioned, the programmable logic controller 120 may cause the second pneumatic valve 166 or other actuation system to activate. In some embodiments, when activated, the second pneumatic valve 166 sends a high volume burst of compressed air to blow the inoperable RFID label 40 off of the vacuum pad 112, thereby causing it to adhere to the paddle 162. In other embodiments, the tamper 170 or other actuation system may use mechanical or other systems to transport the inoperable RFID label or tag 40 from the tamper 170 to the paddle 162, or to move the paddle 162 to the inoperable RFID label or tag 40. In various embodiments, once the inoperable RFID label or tag 40 is adhered to the paddle 162, the paddle 162 retracts or returns to its original position.

In various embodiments, if the next RFID label 34 on the liner 32 is determined to be an operable RFID label 38, the cycle is complete. However, if the next RFID label 34 is determined to be an inoperable RFID label 40, the cycle will repeat until such time as another operable RFID label 38 is fed onto the vacuum pad 112. Over time, the built-up inoperable RFID labels 40 will need to be removed from the paddle 162. Accordingly, the paddle 162 may contain a removable liner that is attachable to the paddle 162 with a removable adhesive. To remove the build-up of inoperable RFID labels 40, the removable liner may simply be peeled off of the paddle 162 and replaced with a new removable liner.

In some embodiments, there is no RFID label with a printed two dimensional bar code thereon. Rather, a roll of RFID tags may contain a liner, and a plurality of "wet" RFID inlays. The "wet" RFID inlays are simply RFID inlays applied to the backer, such as a transparent plastic backer. In some embodiments, the same RFID applicator 100 uses the imager 152 programmed by the one or more processors and/or programmable logic controllers 120 to identify the presence or absence of a printed ink marker, such as a printed ink square, on the RFID inlay. If the marker or square is present, thereby indicating an inoperable RFID tag, the inoperable RFID tag 40 may be removed using the same process as it were a completed label. More specifically, the paddle 162 may be positioned in front of the vacuum pad 112 and the inoperable RFID tag is blown onto the paddle 162. If the printed marker or square is absent, indicating an operable RFID tag, the operable RFID tag is fed onto the vacuum pad 112 to be applied.

In other embodiments, an automated RFID enabled printer applicator (not shown) comprises a label application module 110, one or more processors and/or programmable logic controllers 120, and a RFID label rejecting mechanism 150. The automated label applicator 100 may be any automated RFID enabled printer applicator capable of printing and applying RFID tags and labels to a product, packaging, or cartons of products. The automated RFID enabled printer applicator is typically positioned over or adjacent to a section of conveyer or other materials handling equipment to apply, or encode, print, and apply, the RFID labels or tags directly onto the product, packaging, or cartons of products.

In some embodiments, it may be advantageous to utilize the one or more processors and/or programmable logic controllers 120 to control timing functions of the label application module 110. The label application module 110 may be controlled by the automated label applicator 100 or the RFID enabled printer applicator. Utilizing the one or more processors and/or programmable logic controllers 120 may centralize the user inputs to a single human machine interface 122. The automated label applicator 100 or the RFID enabled printer applicator then may act primarily as a dispenser. In some embodiments that utilize the automated label applicator 100, all electronic and mechanical components are rated at IP65 or higher. This allows the entire apparatus to be used in a wash down environment, such as environments typically seen in food production applications.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An RFID label rejecting system comprising:
   an imager for scanning an RFID label, the imager comprising one or both of a bar code reader and a camera; and
   a label removal component for discarding an inoperable RFID label, the label removal component comprising
      a paddle configured to receive the inoperable RFID label;
      a retraction system comprising a pneumatic valve, the pneumatic valve being configured to position the paddle in an ejection path of the label rejection system to receive a rejected label;
      a vacuum pad configured to hold the rejected label; and
      a second pneumatic valve configured to use compressed air to release the rejected label from the vacuum pad and to adhere the inoperable RFID label to a removable liner on the paddle, wherein the removable liner is configured to receive the rejected label.

2. The system of claim 1, wherein the label removal component comprises a pressurized gas system configured for ejecting the rejected label, the pressurized gas system comprising a pressurized gas reservoir.

3. The system of claim 1, wherein the label removal component includes a tamper for receiving a rejected label.

4. The system of claim 1, further comprising a programmable logic controller configured to control the imager and the label removal component.

5. The system of claim 4, wherein the programmable logic controller triggers the imager to scan the RFID label for operability.

6. The system of claim 4, wherein the programmable logic controller comprises a human machine interface.

7. A method for rejecting an RFID label, the method comprising:
   scanning an upcoming RFID label using an imager;
   determining that the upcoming RFID label is an inoperable RFID label;
   discarding the inoperable RFID label using a label removal component, the discarding operations comprising
      holding the rejected label using a vacuum pad;
      using a retraction system having a paddle, extending the paddle into an ejection path of the label rejection system to receive a rejected label;
      using compressed air, releasing the rejected label from the vacuum pad and adhering the inoperable RFID label to a removable liner on the paddle.

8. The method of claim 7, wherein discarding the inoperable RFID label comprises using a pressurized gas system configured to eject the rejected label, the pressurized gas system comprising a pressurized gas reservoir.

9. The method of claim 8, wherein discarding the inoperable RFID label comprises, prior to ejecting the rejected label using the pressurized gas system, receiving the inoperable RFID label using a tamper.

10. The method of claim 7, wherein scanning the upcoming RFID label for operability is triggered by a programmable logic controller.

11. The method of claim 7, wherein the imager comprises a barcode reader and a camera.

12. The method of claim 7, wherein the scanning detects the inoperable RFID label by recognizing an over printing or a presence of an ink marker.

* * * * *